US012002387B1

(12) United States Patent
Hartman

(10) Patent No.: US 12,002,387 B1
(45) Date of Patent: Jun. 4, 2024

(54) FOLDABLE SIGN HOLDER

(71) Applicant: Spring Steel Stands Inc., Bettendorf, IA (US)

(72) Inventor: Jeffrey K. Hartman, Bettendorf, IA (US)

(73) Assignee: Spring Steel Stands Inc., Bettendorf, IA (US)

( * ) Notice: Subject to any disclaimer, the term of this patent is extended or adjusted under 35 U.S.C. 154(b) by 0 days.

(21) Appl. No.: 16/752,503

(22) Filed: Jan. 24, 2020

Related U.S. Application Data

(60) Provisional application No. 62/796,464, filed on Jan. 24, 2019.

(51) Int. Cl.
*G09F 7/18* (2006.01)
*G09F 7/14* (2006.01)

(52) U.S. Cl.
CPC .................. *G09F 7/18* (2013.01); *G09F 7/14* (2013.01); *G09F 2007/1886* (2013.01)

(58) Field of Classification Search
CPC ....... G09F 7/18; G09F 7/14; G09F 2007/1886
See application file for complete search history.

(56) References Cited

U.S. PATENT DOCUMENTS 2,333,302 A * 11/1943 Enk .......................... G09F 3/206 40/643
5,682,696 A * 11/1997 Gill ........................... G09F 7/12 248/156
5,937,555 A * 8/1999 Query ....................... G09F 7/00 40/610
2015/0364064 A1* 12/2015 Smith ....................... G09F 7/20 40/610

* cited by examiner

*Primary Examiner* — Gary C Hoge
(74) *Attorney, Agent, or Firm* — Hamilton IP Law, PC.; Jay R. Hamilton

(57) ABSTRACT

A foldable bag sign holder allowing for a low profile is disclosed having a center portion with ends bendable to meet the center portion or extend past the center portion in a configuration useful for shipping and storage and in another configuration having the ends transverse away from the center portion so that the ends of the legs may be placed in the ground and a bag sign may be engaged with and slid over the center portion, angled portions and legs during deployment of the foldable sign holder. The bag sign and foldable sign holder may be sold together as a kit.

9 Claims, 6 Drawing Sheets

FOLDABLE SIGN HOLDER

CROSS REFERENCE TO RELATED APPLICATIONS

Applicant claims priority from provisional U.S. Pat. App. No. 62,796,464 filed on Jan. 24, 2019, which is incorporated by reference herein in its entirety.

FIELD OF THE INVENTION

The present invention relates to a sign holder. More specifically, the invention relates to a foldable sign holder constructed from a wire segment, such as those employed for yard signs and particularly bag signs, as the sign holders can be difficult or awkward to ship and transport.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DETAILED DESCRIPTION—BRIEF DESCRIPTION OF DRAWINGS

DETAILED DESCRIPTION—LISTING OF ELEMENTS

| Element Description | Element Number |
|---|---|
| Segment (wire) | 0 |
| First end | 1 |
| Center portion | 2 |
| Second end | 3 |
| Foldable sign holder | 10 |
| First leg | 11 |
| Second leg | 13 |
| | 20 |
| First curved portion | 21 |
| Second curved portion | 23 |
| Angle formed by first curved portion | 25 |
| Angle formed by first curved portion | 27 |
| Total dimension | 30 |
| First leg dimension | 31 |
| Center portion dimension | 32 |
| Second leg dimension | 33 |
| Bag sign | 40 |
| First side | 40a |
| Second side | 40b |
| Third side | 40c |
| Fourth side (opening) | 40d |
| Front side | 40e |
| Direction moving end towards center | A |

DETAILED DESCRIPTION OF INVENTION

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like “front”, “back”, “up”, “down”, “top”, “bottom”, and the like) are only used to simplify description of the present invention, and do not alone indicate or imply that the device or element referred to must have a particular orientation. In addition, terms such as “first”, “second”, and “third” are used herein and in the appended claims for purposes of description and are not intended to indicate or imply relative importance or significance.

The following detailed description is of the best currently contemplated modes of carrying out illustrative embodiments of the invention. The description is not to be taken in a limiting sense, but is made merely for the purpose of illustrating the general principles of the invention, since the scope of the invention is best defined by the appending claims. Various inventive features are described below herein that can each be used independently of one another or in combination with other features.

ILLUSTRATIVE EMBODIMENT AND ADVANTAGES OF INVENTION

Figure 1A:
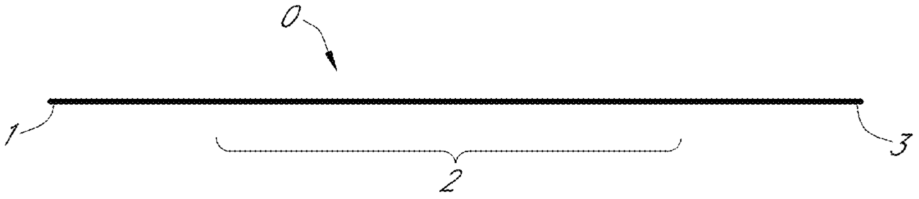
FIG. 1A illustrates a single segment 1 prior to configuration as a foldable sign holder 10.
Figure 1B:
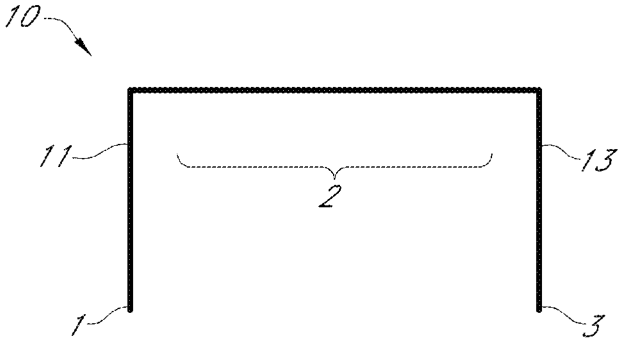
FIG. 1B illustrates the foldable sign holder 10 configured from the single segment by forming a pair of legs at each angled portion.
Figure 1C:
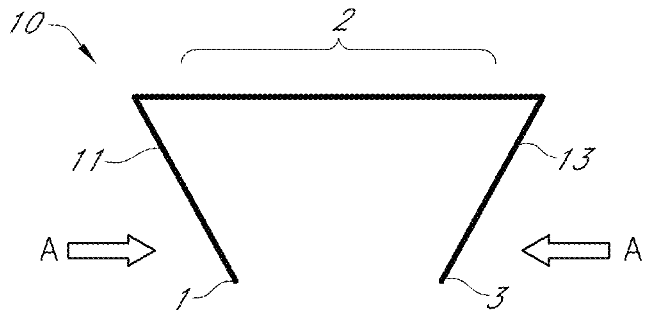
FIG. 1C illustrates the foldable sign holder 10 transitioning from the first configuration (deployed) for use as a sign holder as shown in FIG. 1B to a second configuration (folded) for shipping or storage purposes.
Figure 1D:
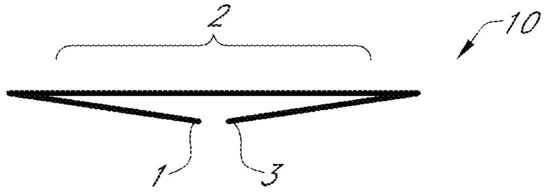
FIG. 1D illustrates the sign holder 10 in the second (folded) configuration for shipping or storage.
Figure 2A:
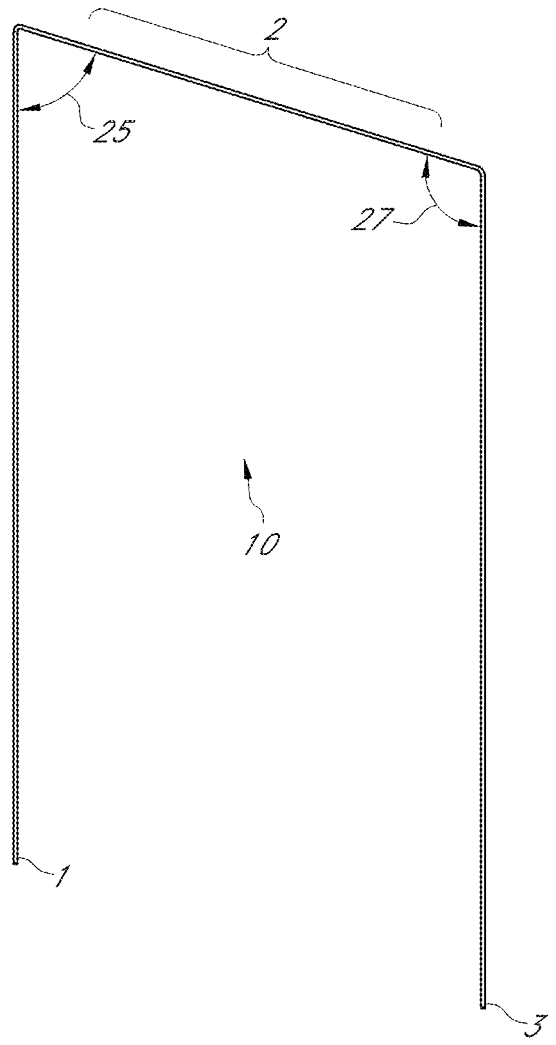
FIG. 2A shows a perspective view of the foldable sign holder 10 configured for use with a bag sign, prior to installation of the bag sign.
Figure 2B:
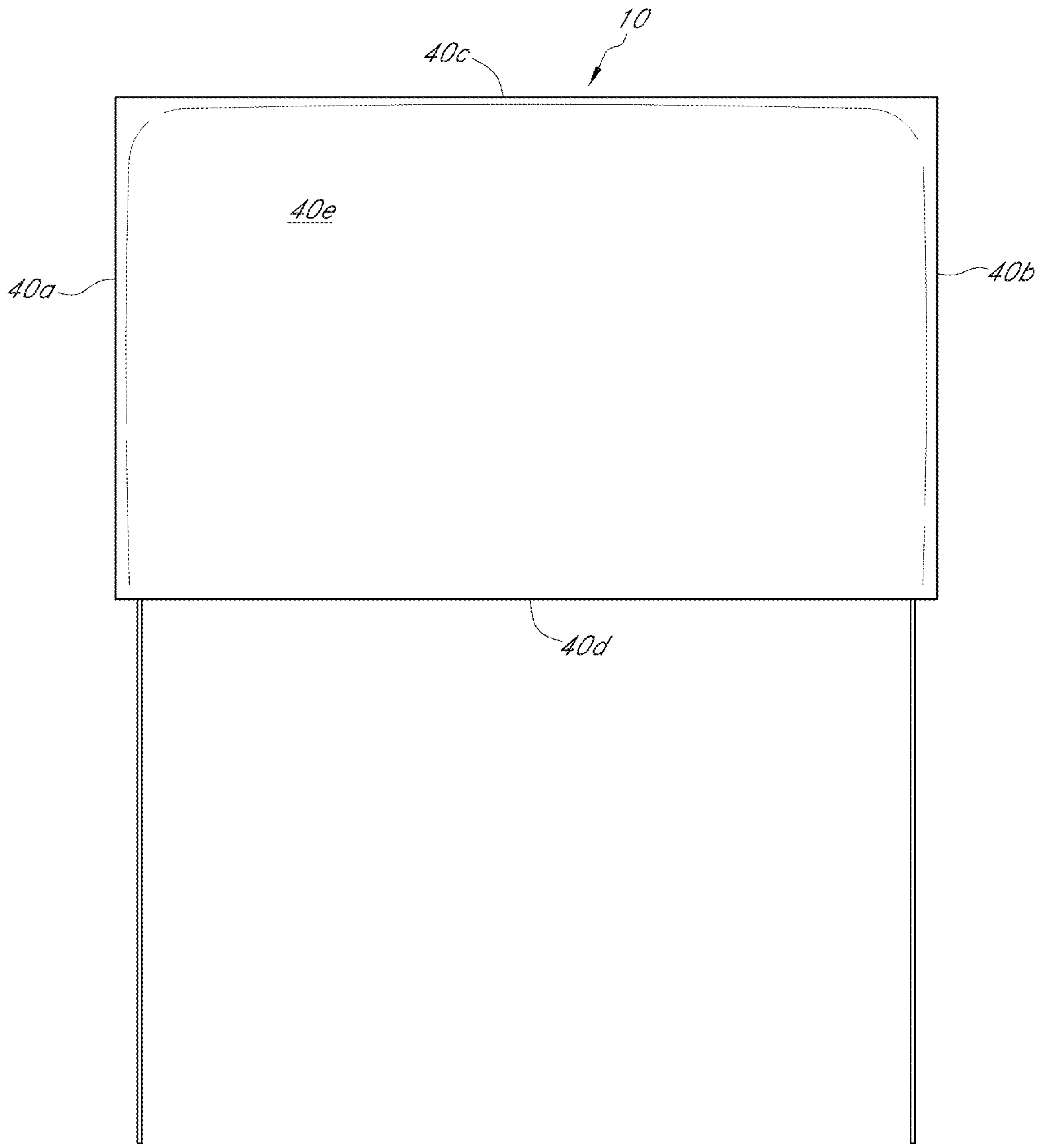
FIG. 2B shows a perspective view of the foldable sign holder 10 deployed with a bag sign attached therein.

FIG. 1A illustrates the sign holder 10 configured as a single segment of nine-gauge steel wire 0 having a length of eighty-eight (88) inches, defined as the total length dimension 31. One of ordinary skill will appreciate that construction of the foldable sign holder is not limited to any particular material, gauge or dimension and may be constructed from any material suitable for a particular application that provides sufficient rigidity when the foldable sign holder 10 is deployed and discussed further herein, sufficient flexibility to allow the legs to move and back forth between the folded position to the deployed As shown the segment has a first end 1, a center portion 2 and a second end 3. As shown in FIG. 1B, the sign holder 10 has been configured from the single segment of wire 0 by forming a first and second curved portion (21, 23) with an angle 25 of ninety (90) degrees thirty-two (32) inches from each end (1, 3) creating a first leg 11 from end 1 to center portion 2 and a second leg 13 from center portion 2 to second end 3. The dimension of each leg is defined, respectively, as first leg dimension (31) and second leg dimension (33). The dimension of the center portion 2 now has length of twenty-four (24) inches and is defined as the center portion dimension 32. As shown in FIG. 1C, for shipping or storage purposes, the ends (1, 3) may be pushed in direction A towards center portion 2 to form a sign holder 10 having a low profile which is easier to package, store, ship and sell at retail as it requires less rack space. The ends (1, 3) may be pushed up to and slightly past the center portion 2 as required for the foldable sign holder 10 to remember its position and fit within the tube, carton, sleeve or bag which it is placed in for shipping, transport or storage as shown in FIG. 1D. As shown in this first configuration for transport and storage, the first angle 25 formed by the first angled portion 21 and the second angle 27 formed by second angled portion 23 are each less than ninety degrees and the end of the first leg 1 and the end of the second leg 3 are each adjacent the center portion 3. In the second configuration for deployment of a sign, as shown in FIGS. 2A and 2B, the angle of the first angled portion 25 and the angle of the second angled portion 27 approach or equal ninety degrees and the first end of the first leg 1 and the second end of the second leg 3 are configured for engagement with a ground surface (not shown) in a deployed configuration. Upon removal of the folded foldable sign holder 10 from the tube, carton, sleeve or bag which it is placed in for shipping, transport or storage, the foldable sign holder may be unfolded for deployment, as shown in FIG. 2A, and engagement with a bag sign 40 as shown in FIG. 2B. One of ordinary skill will appreciate that the dimensions discussed and disclosed herein are for purposes of enablement without restriction or limitation as to the breadth of the invention. The bag sign of FIG. 2B bag sign 40 is formed as an envelope defined by four sides, a front 40*e* and a back side (not shown), which include a first side 40*a* and a second side 40*b*, the second side 40*b* opposite the first side 40*a*. A third side 40*c*, the third side 40*c* connecting the first and the second sides (40*a*, 40*b*) and positioned at the top of the bag sign 40. The fourth side 40*d* connects the first and the second sides (40*a*, 40*b*) and is positioned at the bottom of the bag sign, wherein the first, the second and the third sides (40*a*, 40*b*, 40*c*) are sealed and the fourth side 40*d* is configured as an opening. The opening (fourth side) of the bag sign 40 is positioned over the center portion 2 and the bag sign 40 is to be slid down onto the foldable sign holder 10 around the angled portions (21, 23) to enclose the center portion 2 and the upper portion of the first leg and second leg (11, 13). For purposes of enablement and without limitation or restriction, the bag sign shown in FIG. 2B has a dimension of twenty-six (26") inches by sixteen (16") inches.

Figure 3:
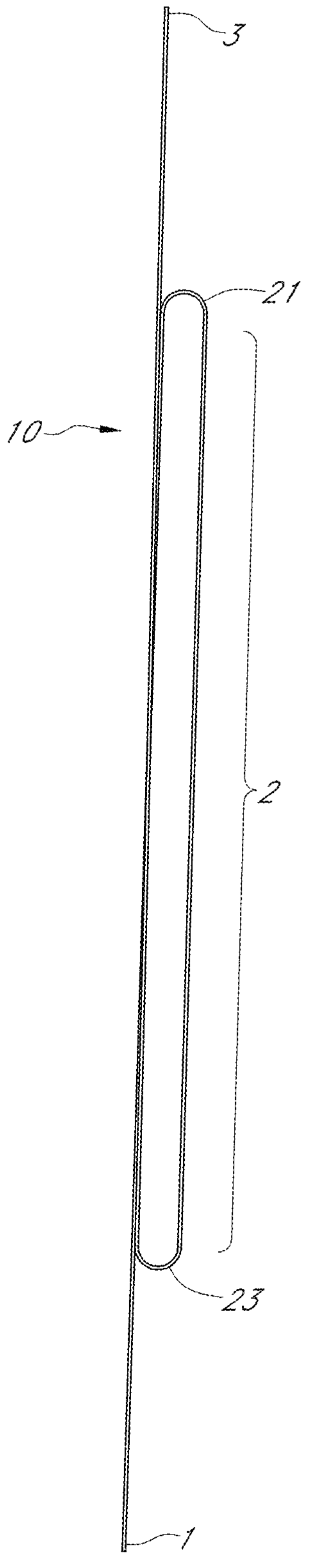
FIG. 3 shows a perspective view of the foldable sign holder 10 of FIG. 2A folded for storage.

FIG. 3 shows a perspective view of the foldable sign holder 10 of FIG. 2A folded for storage, transport or packing. As shown, the foldable sign holder 10 was constructed so as to be sufficiently flexible to allow the legs of the foldable sign holder to be bent between positions with losing memory necessary to support sign deployment. As shown, in at least on embodiment, the first and the second angled portions are configured as a curved transition from the center portion to the legs (11, 13).

Figure 4:
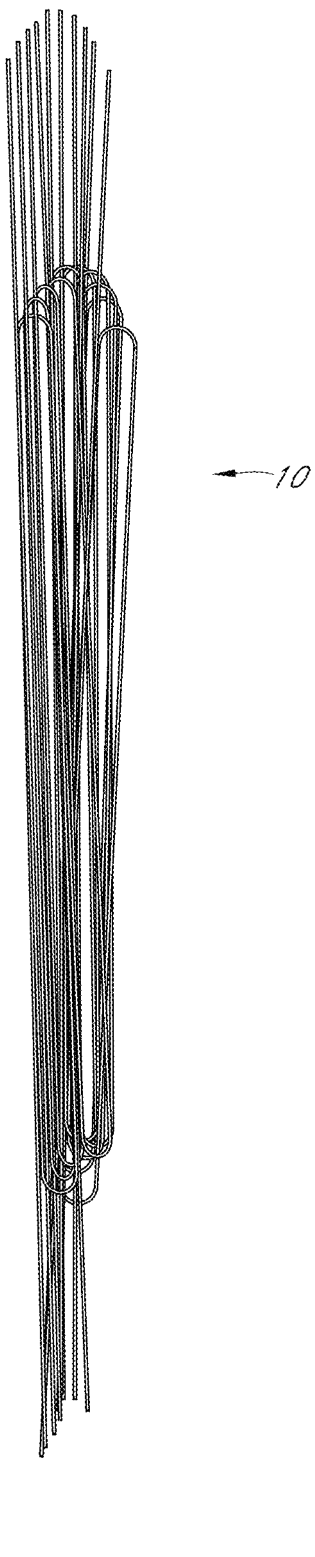
FIG. 4 illustrates the narrow profile multiple foldable sign holder 10 present when folded as described for packing, storage or shipment.

FIG. 4 illustrates the narrow profile of multiple foldable sign holders 10 when folded as described for shipment. The foldable sign holder 10 shown in FIGS. 1-4 is particularly suited to a bag sign 40 which may be fitted to slide down over the foldable sign holder 10. One of ordinary skill in the art will appreciate that the sign holder 10 and bag (useful as the labeled sign) 40 may be packaged together as an "all-in one" sign kit.

The following modifications, although not shown, would be obvious to one of ordinary skill in the art in view of the present disclosure. The various elements of the foldable sign holder10 may be separately formed and later engaged with one another (e.g., via mechanical fasteners, material fusing, chemical adhesives, etc.) or integrally formed with one another therein. The materials used to construct the foldable sign holder10 and various elements thereof will vary depending on the specific application of the foldable sign holder10, but it is contemplated that steel, aluminum, plastic, polymers, other synthetic materials, natural materials, and/or combinations thereof will be especially useful for some applications in whole or in part. Accordingly, the above-referenced elements may be constructed of any material known to those skilled in the art or later developed, which material is appropriate for the specific application of the foldable sign holder 10, without departing from the spirit and scope of the foldable sign holder10 as disclosed and claimed herein.

Having described the preferred embodiments, other features of the foldable sign holder10 will undoubtedly occur to those versed in the art, as will numerous modifications and alterations in the embodiments as illustrated herein, all of which may be achieved without departing from the spirit and scope of the foldable sign holder10 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and deployment of the foldable sign holder10 for holding and securing bag signs during deployment and or when folded up for transport in packaging or storage or display. Furthermore, the methods and embodiments pictured and described herein are no way limiting to the scope of the foldable sign holder10 and method of use unless so stated in the following claims.

It should be noted that the foldable sign holder 10 is not limited to the specific embodiments pictured and described herein but is intended to apply to all similar apparatuses and methods for providing the various benefits and/or features of a foldable sign holder10. Modifications and alterations from the described embodiments will occur to those skilled in the art without departure from the spirit and scope of the foldable sign holder10. It is understood that the foldable sign holder 10 as disclosed herein extends to all alternative combinations of one or more of the individual features mentioned, evident from the text and/or drawings, and/or inherently disclosed. All of these different combinations constitute various alternative aspects of the foldable sign holder 10 and/or components thereof. The embodiments described herein explain the best modes known for practicing the foldable sign holder10 and/or components thereof and will enable others skilled in the art to utilize the same. The claims are to be construed to include alternative embodiments to the extent permitted by the prior art.

While the foldable sign holder10 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification. It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

The invention claimed is:

1. A method for displaying a bag sign above a ground surface using a foldable sign holder comprising removing and unfolding a foldable sign holder in a first configuration from a tube, a carton, a sleeve or a bag for shipping and transport to a second configuration for display, wherein the foldable sign holder is further comprised of:

(a) a center portion;

(b) a first angled portion connected to the center portion to form a first leg, the first leg terminating at a first end; and, (c) a second angled portion connected to the center portion to form a second leg, the second leg terminating at a second end, wherein the center portion, the first angled portion and the second angled portion are constructed from a single segment comprised of a steel wire, and in the first configuration the first leg and the second leg are each adjacent the center portion, so that moving the first leg away from the center portion forms a first angle and moving the second leg away from the center portion forms a second angle to position the foldable sign holder in the second configuration.

2. The method for displaying a bag sign above a ground surface using a foldable sign holder according to claim 1 wherein a bag sign is positioned for engagement with the foldable sign holder proximate the center portion wherein the bag sign is configured as an envelope defined by four sides further comprising: i) a first side, ii) a second side, the second side opposite the first side; iii) a third side, the third side connecting the first and the second sides and positioned at the top of the bag sign; iv) a fourth side, the fourth side connecting the first and the second sides and positioned at the bottom of the bag sign, wherein the first, the second and the third sides are sealed and the fourth side is open, wherein the center portion is positioned in the open fourth side and the bag sign is slid down onto the foldable sign holder in the second configuration.

3. The method for displaying a bag sign above a ground surface using a foldable sign holder according to claim 1 wherein the length of the tube, the carton, the sleeve or the bag for shipping and transport is greater than thirty-six (36) inches.

4. The method for displaying a bag sign above a ground surface using a foldable sign holder according to claim 1 wherein in the second configuration, the first angle and the second angle are each equal to ninety degrees.

5. The method for displaying a bag sign above a ground surface using a foldable sign holder according to claim 4 wherein a bag sign having an opening and three sides may be positioned onto and over the center portion, the first angled portion and the second angled portion via the opening of the bag sign.

6. The method for displaying a bag sign above a ground surface using a foldable sign holder according to claim 4 wherein the length of the tube, the carton, the sleeve or the bag for shipping and transport is greater than thirty-six (36) inches.

7. The method for displaying a bag sign above a ground surface using a foldable sign holder according to claim 1 further comprising the step of inserting the first end of the first leg and the second end of the second leg into a ground surface to support the foldable sign holder.

8. The method for displaying a bag sign above a ground surface using a foldable sign holder according to claim 1 wherein a bag sign having an opening and three sides may be positioned onto and over the center portion, the first angled portion and the second angled portion via the opening of the bag sign.

9. The method for displaying a bag sign above a ground surface using a foldable sign holder according to claim 8 wherein the first end of the first leg and the second end of the second leg engage with a ground surface in a deployed configuration.

* * * * *